United States Patent [19]
Jovicic et al.

[11] Patent Number: 5,855,007
[45] Date of Patent: Dec. 29, 1998

[54] ELECTRONIC COUPON COMMUNICATION SYSTEM

[76] Inventors: Neboisa Jovicic, New Hampshire College, Box 984, 2500 N. River Rd., Manchester, N.H. 03106; Gene A. Rosov, 13 Chester Sq., Annisquam, Mass. 01930

[21] Appl. No.: 559,777

[22] Filed: Nov. 15, 1995

[51] Int. Cl.⁶ .................................................. G06F 17/60
[52] U.S. Cl. ............................................................ 705/14
[58] Field of Search ................................ 705/14; 348/13, 348/522

[56] References Cited

U.S. PATENT DOCUMENTS

| | | | |
|---|---|---|---|
| Re. 34,915 | 4/1995 | Nichtberger et al. | 705/14 |
| 5,185,695 | 2/1993 | Pruchnicki | 705/14 |
| 5,249,044 | 9/1993 | Von Kohorn | 348/12 |
| 5,287,181 | 2/1994 | Holman | 348/473 |
| 5,353,218 | 10/1994 | DeLapa et al. | 705/14 |
| 5,416,842 | 5/1995 | Aziz | 380/30 |
| 5,420,606 | 5/1995 | Begom et al. | 345/156 |
| 5,426,594 | 6/1995 | Wroght et al. | 395/200.36 |
| 5,604,542 | 2/1997 | Dedrick | 348/552 |
| 5,612,730 | 3/1997 | Lewis | 348/8 |
| 5,612,868 | 3/1997 | Off et al. | 705/14 |

OTHER PUBLICATIONS

"USA:SLED Internet Directory Distributes Electronic Coupons", Pr Newswire, May 9, 1994.

"Interactive Cable System Receives Strong Response", Direct Marketing, pp. 9–10, Dec. 1992.

"USA: Sled InterNIC debut Internet services", PC Week, p. 130, May 16, 1994.

"The Internet Coupon Directory", web page @www.coupondirectory.com 1997.

*Primary Examiner*—Gail O. Hayes
*Assistant Examiner*—Alexander Kalinowski
*Attorney, Agent, or Firm*—Don Halgren

[57] ABSTRACT

An electronic coupon communication system for generating and redeeming unique product discount coupons over public computer networks such as the Internet. The system comprises a first Internet node, an Internet coupon server and an Internet coupon notification center. The Internet coupon server generates a unique Internet coupon using a coupon generation process. The Internet coupon server accepts an on-line selection of one of the available unique Internet coupons from a user of the Internet node and transmits the coupon back to the user's printing device or e-mail storage. It then records the transaction in its coupon database and notifies the transaction to the Internet Coupon Notification Center. The Internet Coupon Notification Center subsequently records the transaction. Furthermore, a coupon redemption center can electronically verify coupon validity and record coupon redemption by communicating with the Internet Coupon Notification Center.

9 Claims, 9 Drawing Sheets

| 302 | 304 | 306 | 308 | 310 | 312 | 314 | 316 |
|---|---|---|---|---|---|---|---|
| DISCOUNT TITLE | PRODUCT TITLE | OWNER'S TITLE | COUPON SPEC. | UNIFORM PRODUCT CODE | BAR CODE IMAGE | EXP. DATE | PRODUCT IMAGE |

| 318 | 320 | 322 | 324 | 326 |
|---|---|---|---|---|
| COUPON SERIAL NUMBER | USER'S NAME | USER'S I.D. | USER'S INTERNET ADDRESS | PERSONAL MESSAGE |

ELECTRONIC COUPON COMMUNICATION SYSTEM

BACKGROUND OF THE INVENTION

1. Field of the Invention

This invention relates to redeemable product discount coupons, and more particularly to systems for generating and redeeming product discount coupons over public computer networks such as the Internet.

2. Prior Art

Discount coupons have long been distributed by manufacturers to market their products and by retail stores to attract consumers to their particular stores. For decades advertisers have issued or published printed coupons which can be taken to a redemption center, such as a retail store, and redeemed for some value or as a discount toward the purchase of some item. While this method has proven to be effective, there are many disadvantages to the process for the user, for the redemption center or retail store, as well as for the advertisers themselves.

The problem associated with clipping coupons by a user are numerous. First, a user must purchase or otherwise obtain a publication, and search through such publication for coupons which would be useful or meaningful to the user. The user then must cut out such coupons being of various sizes and shapes, leaving a pile of scrap paper and holes in the pages of the publication. Some advertisers use handouts or flyers which make the searching job easier, but there is still the problem of cutting out of the coupons which is annoying and a waste of valuable time. Being of different sizes and pertaining to different types of products, the user must separate the coupons into product categories and band the coupons together in the best way possible. The user then stuffs these sorted coupons into a pocket or purse and is off to the market. Upon arrival at a particular market outlet, the user usually fumbles through his or her coupons and attempts to find the products in the store. Furthermore, in order to redeem some coupons, the user may find it necessary to search out the desirable item in a number of stores. Finally, upon gathering the products into the pushcart, the user has yet another manipulation to make, i.e. he or she must select the coupons for which the products are purchased from a number of coupons the user bought to the store initially.

This then leads to the next problem associated with coupon redemption. After the customer leaves, the retail store is still not relieved from further expenditure of valuable employee time, since the accumulated coupons in the retail store must be sorted by manufacturer for retail store reimbursement.

Insofar as the manufacturer of the product is concerned, while there is direct evidence that consumers are reading their ads and using coupons, and the number of coupons coming back to the manufacturer indicates some level of success in advertising, there is very little additional marketing information that can be derived from this type of coupon redemption scheme. The manufacturer has no information which would be of great value to the manufacturer in planning future advertising programs. Since each coupon is submitted anonymously, the manufacturer does not know how to reach that person again for arousing interest in related products. While some demographic information can be obtained by noting the geographical regions in which the coupons were redeemed, the lack of any specific information as to the nature of the purchaser leads many manufacturers to conduct separate marketing surveys which are extremely costly and time consuming. Some manufacturers are known to have spent millions of dollars to gather such information.

Moreover, the current system of clearing coupons which are distributed and redeemed usually involves physically sending redeemed coupons to a clearing house. The clearing house returns the coupons to the manufacturer (issuer) and issues debits and credits to the manufacturer and retailer, or factors coupons for the retailer. This physical handling of coupons is expensive, cumbersome, error prone, slow and subject to manipulation.

It can therefore be appreciated that there are many problems associated with existing coupon redemption programs, and the drawbacks of these systems are numerous and disliked by all three entities involved, the consumer, the redemption center (retail outlet store) and the manufacturer.

Today's ever increasing use of public computer networks such as the Internet renders many benefits and advantages compared to the present day means for generating and redeeming coupons.

The present invention overcomes the deficiencies and disadvantages of current coupon redemption system outlined above, by providing a unique electronic redeemable coupon generating and redemption system and method using public computer networks such as the Internet, whereby a) consumer significantly decreases the amount of time and effort expended in locating, clipping and assembling of coupons, b) the redemption center (retail outlet) is enabled to more quickly and automatically credit the coupon amounts and in organizing and reporting the coupons which have been redeemed, c) the manufacturer is enabled to get quick results in the amount of usage, and detailed information about the consumer including name, address, interests, and other data which would permit the manufacturer to access the value of the coupon distributing effort and to modify future marketing plans, d) increase redemption and clearing, e) eliminate fraudulent redemptions of the type that are characteristic of conventional coupon distribution and redemption systems.

Still other objects of the invention include, but are not limited to the following:

- to provide a system in which a consumer selects coupons at home, using his computer machine connected to a public computer network, optionally prints the coupon on a printer, and redeems the coupon upon completion of shopping in that store or later, but within the period of validity of the coupon;
- to provide a system which generates coupons with unique serial numbers and upon selection of such coupons by the consumer, records the selection, including coupon's serial number and user's identification number in the coupon database;
- to provide a system wherein coupon selections by a consumer on the Internet coupon server, are immediately and automatically notified to various Internet coupon notification centers owned by the coupon owner or its agent, promoting a particular coupon from the group of coupons selected by the consumer, said system recording all coupon transactions in its database;
- to provide optional means wherein easy verification of coupons is achieved in the coupon redemption center (retail outlet) by comparison of consumer's coupon print-out or other expression of coupon's serial number, and the coupon data stored in a Internet coupon notification center linked with retail outlet's computer system;

to provide a coupon distribution and redemption system which can identify users of the system before they make coupon selections and offer different coupons to different users of the system before they make coupon selections on the basis of already-obtained demographic data about the users.

A feature of the present invention is that personalized messages may be recorded on the electronic coupon, tailored for each consumer, permitting full utilization of micromarketing techniques and concepts.

An added feature of the present invention is that the coupons may take an entirely electronic form, providing for optional electronic redemption at the retail outlet, and optional electronic storage in the memory of the user's general computing device.

Another added feature of the present invention is that it creates logistical efficiency by the centralization of coupon generation, delivery, processing and verification on one central Internet Coupon Server linked to various Internet servers offering coupons, thus decreasing computer network congestion.

BRIEF SUMMARY OF THE INVENTION

In carrying out one form of this invention, there is provided an electronic coupon communication system and method therefor, the electronic coupon communication system comprising an Internet node, an Internet Coupon Server, and an Internet Coupon Notification Center communicating over a public computer network such as the Internet.

During an on-line connection between an Internet node and the Internet Coupon Server, the Internet coupon server accepts coupon selection from a user, and then transmits the unique Internet coupon back to the user's printing device or user's electronic mail storage device. It further records the transaction to the coupon's Internet Coupon Notification Center which at the time of actual purchase will verify coupon's validity, update user's billing information and record coupon's redemption.

The invention thus comprises an electronic coupon communication system, comprising a network node for selecting, receiving and printing electronic coupons over a public computer network such as the Internet, the node including a display coupled to a control processing unit for displaying at least one electronic coupon, a memory for storing electronic coupons received through electronic transmission from an Internet Coupon Server, which memory permits browsing on the display, a user input device coupled to the central processing unit to permit a user to make an on-line selection of one of a plurality of electronic coupons collectively stored in the Internet Coupon Server's memory, the Internet Coupon Server being coupled to the Internet Coupon Notification Center, the Internet Coupon Server comprising a memory for storing electronic coupons received from an Internet Coupon Server's supplier, a central processing unit for generating and transmitting electronic coupons and for recording and transmitting electronic coupon transactions, an Internet Coupon Notification Center Gateway for enabling communication with the Internet Coupon Notification Center, an Internet Coupon Notification Center, including means for recording serial numbers of coupons generated by an Internet Coupon Server, means for recording and updating transactions pertaining to redeemed electronic coupons, and an electronic coupon, comprising a plurality of digital representations of product image and uniform product bar code, a plurality of digital representations of indicia identifying discount information, product title, coupon owner's title, redemption specification, uniform product code, expiration date, coupon serial number, user's name, user's identification number, user's Internet address and user's personalized message.

The invention further comprises computer machine means for storing electronic coupon elements, including means for generating electronic coupons, means for storing a collection of electronic coupons, means for recording coupon transmission, means for transmitting information about coupon transactions, and means for recording user data. The Internet Coupon Server, utilizes a method of operation comprising the steps of generating a new electronic coupon with a unique serial number upon the beginning of an on-line session with an Internet node, transmitting the selected electronic coupon over a public computer network, and recording the transmission in the coupon data base.

The invention also comprises a method of generating a desired coupon in an electronic coupon communication system, comprising the steps of selecting an electronic coupon by a user of a computer network node during an on-line session with a computer network Coupon Server, selecting a coupon from the computer network Coupon Server, generating a new coupon at the beginning of an on-line session, receiving a user selection of the electronic coupon during the on-line session from the computer network Coupon Server to the computer network node, transmitting the electronic coupon to the user's computer network node during the on-line session, displaying the electronic coupon on a display device on the computer network, generating an optional request message for requesting the electronic coupon to be sent electronically, transmitting the optional request message corresponding to the selection of the electronic coupon request message including the electronic mail address of destination, arranging a coupon data base update in response to the electronic coupon transmission, for recording the transaction, including the user's identification number and coupon serial number, changing the coupon serial number in coupon data base, sending a message to a computer network Coupon Notification Center, the message comprising the coupon serial number and the user's identification number. The electronic coupon generation process includes taking coupon indicia and digital representations of graphical images in the coupon data base, coupling the coupon indicia with the user indicia in the user data base, and placing the coupon indicia in a browsing memory to represent an electronic coupon. Coupon verification includes verifying the validity of an electronic coupon at a redemption center by accessing the computer network's Coupon Notification Center's coupon generation data base. Coupon redemption notification occurs when the redemption center records the redemption of coupons by sending a message to the computer network Coupon Notification Center's redemption data base.

BRIEF DESCRIPTION OF THE DRAWINGS

The objects and advantages of the present invention will become more apparent when viewed in conjunction with the following drawings, in which:

FIG. 3 is a timing diagram illustrating an exemplary message coupon format according to the preferred embodiment of the present invention;

DESCRIPTION OF THE PREFERRED EMBODIMENTS

Figure 1:
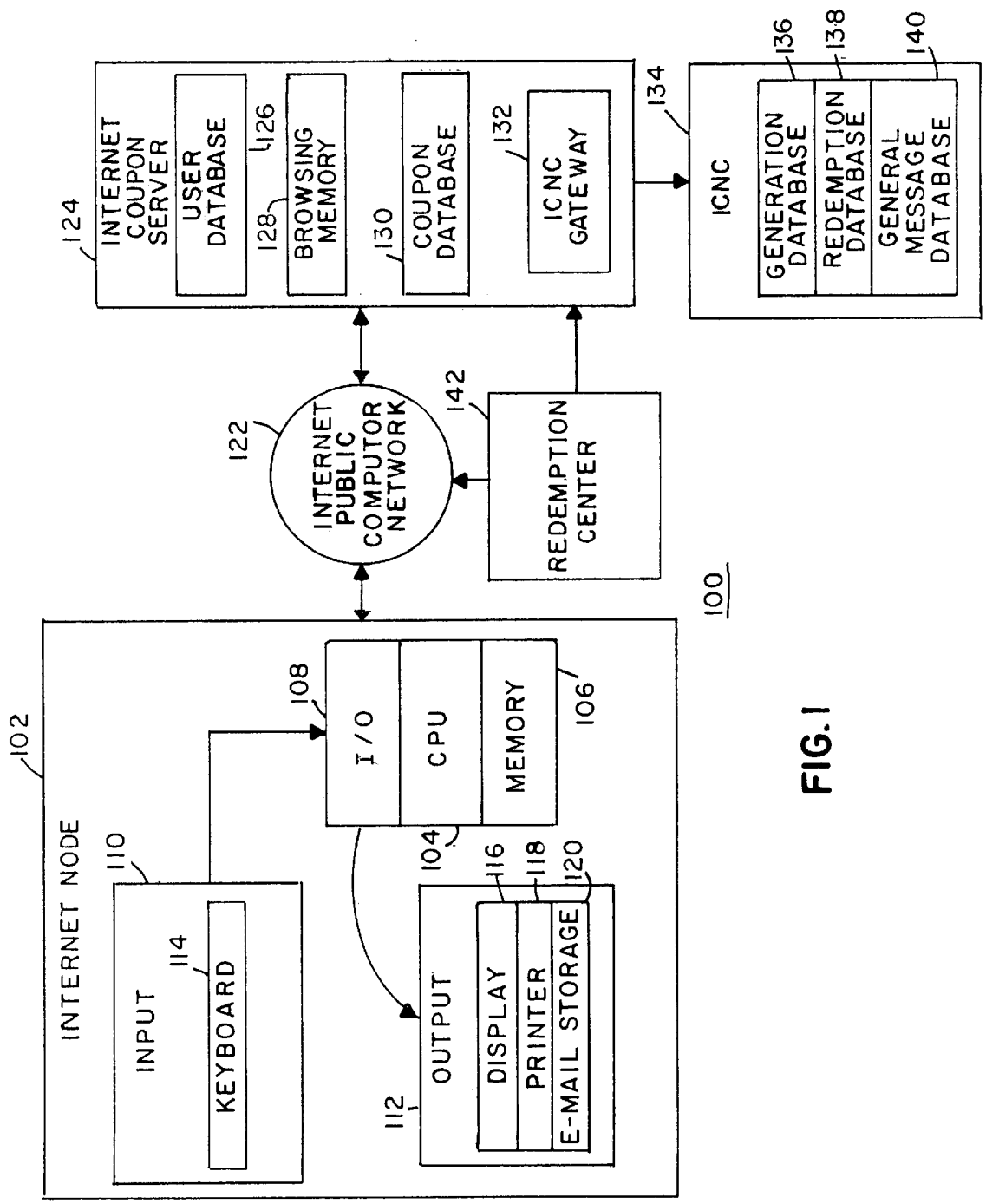
FIG. 1 is a block diagram of a communication system according to the preferred embodiment of the present invention.

The present invention is shown in FIG. 1 which illustrates a communication system 100 in which an Internet node 102 is defined as a general purpose digital computer or similar machine device connected to a public computer network, which for our purposes will be identified as the Internet 122, over digital and analog wire lines, utilizing dial-up telephone lines or direct telephone lines through the public switched telephone network (PSTN) or integrated services digital network (ISDN). Specifically, Internet node 102 can communicate using Internet Protocol (IP) with another computer connected into a public computer network such as the Internet 122. Internet Protocol (IP) RFC 791, Transmission Control protocol (TCP) RFC 793, the TCP/IP protocol suite which is described in RFC 1122, and associated other RFCs mentioned below, are all available from SRI International, DDN Network Information Center, Room EJ291, 333 Ravenswood Avenue, Menlo Park, Calif. 94025. However other communication devices, such as personal communicators coupled to a public computer network through wireless transmissions are contemplated within the scope of the present invention.

Figure 2:
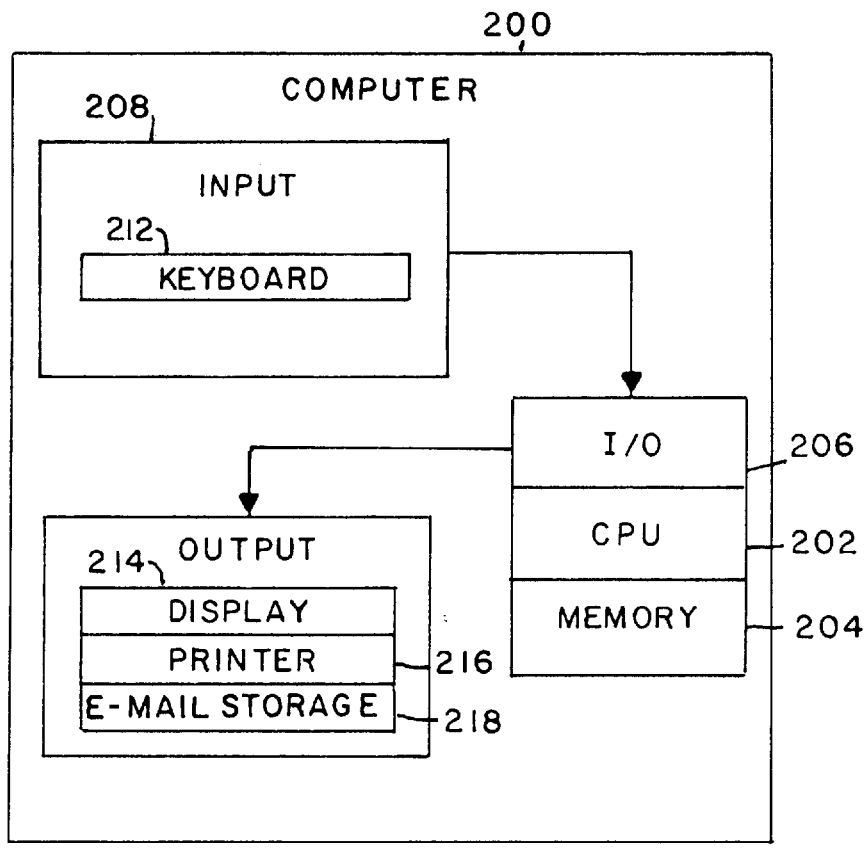
FIG. 2 is an electrical block diagram of an Internet node according to the preferred embodiment of the present invention.
Figure 4:
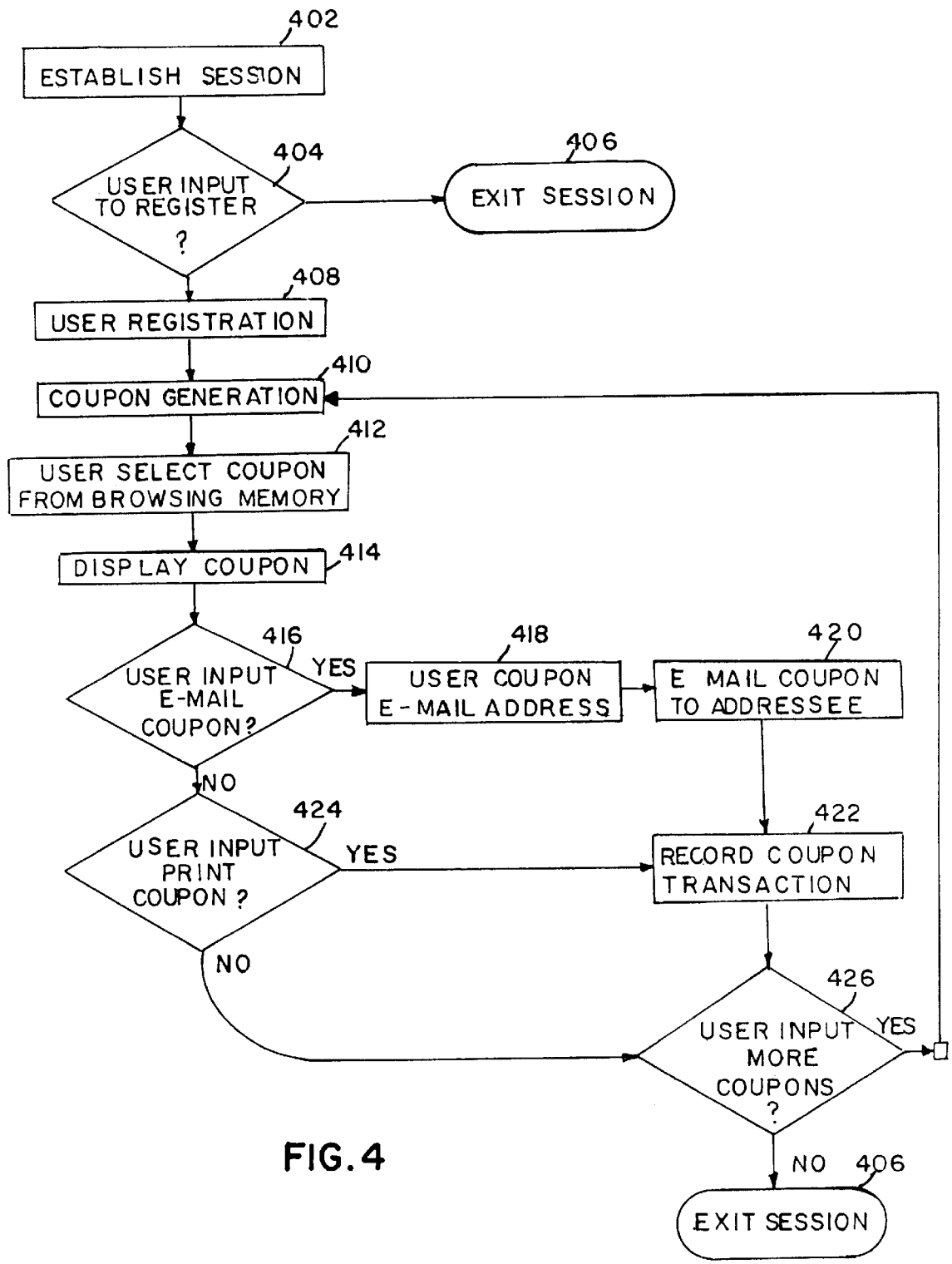
FIG. 4 is a flow diagram illustrating an operational sequence for the communication system in FIG. 1 according to the preferred embodiment of the present invention.

FIG. 2 illustrates an exemplary Internet node (computer) 200 in accordance with the teachings of the present invention. Shown is a computer 200 which comprises three major components. The first of these is an input/output (I/O) circuit 206 which is used to communicate information in appropriately structured form to and from other portions of the computer 200. In addition, the computer 200 includes a central processing unit (CPU) 202 coupled to the I/O circuit 206 and a memory 204. These elements are those typically found in most general purpose computers and, in fact, computer 200 is intended to be representative of a broad category of data processing devices. A display monitor 214 is shown coupled to the I/O circuit 206 and issued to display images generated by CPU 202 in accordance with the present invention. Any well known variety of cathode ray tube (CRT) or other type of display may be utilized as display 214. Furthermore, computer 200 preferably includes one or more input devices which are coupled to the I/O circuit 206 for receiving input from a user. For example, user input can be received by means of a keyboard 212. The computer 200 preferably includes one or more output devices coupled to the I/O circuit 206 for presenting information to the user of the computer. For example, a high resolution printer 216 can be coupled to the I/O circuit 206 for printing hard copy to communicate information to the user of the computer 200.

As shown in FIG. 1, the Internet node 102 is coupled to an Internet Coupon Server 124 via Internet 122. The Internet Coupon Server 124 is any general purpose digital computer which serves as an "Internet Host" as described in the Internet Protocol RFC 791, and contains electronic coupons 300 and would preferably include a user database 126 which would keep track of the individual users registered with the Internet Coupon Server, a browsing memory 128 where representative coupon or coupons are stored and ready for selection by users, and a coupon database 130 which will be more fully discussed below. In addition, The Internet Coupon Server 124, also includes Internet Coupon Notification Center Gateway 132 (ICNC gateway) for communicating with a plurality of Internet Coupon Notification Centers (ICNC) 134. The ICNC gateway 132 preferably also includes a computer database identifying interfacing information for accessing one or more ICNCs 134 through the interface. ICNC 134 could be either communicating with the ICNC gateway 132 over public computer network such as the Internet 122, as shown in FIG. 1 or physically present within the Internet Coupon Server. Each ICNC 134 is the owner of one particular category of coupons, for example a "Ben & Jerry's Inc." coupon category which gives $0.25 discount on "Ben & Jerry's Vanilla Bean Ice Cream", and could comprise a coupon generation data base 136 for storing data about electronic coupons generated by the Internet Coupon Server 124, a coupon redemption database 138 for storing data about electronic coupons redeemed by users, general message database 140 for storing messages of general nature, and optionally, a printing device which records coupon transactions. Periodically, the ICNC 134 can communicate with the Internet Coupon Server 124, such as by the Internet Coupon Notification Center Gateway 132, and update Internet Coupon Server's Coupon Database 130, regarding the discount value of the coupon, number of coupons available, and coupon specifications. In this way, the Internet Coupon Server can maintain current information on electronic coupons 300 available to consumers. Typically, these consumers would be users of computing devices that are connected into public computer networks such as the Internet 122. As new providers of coupons become members of the electronic coupon communication system 100, they can establish ICNCs 134 and make their electronic coupons available to consumers over the Internet Coupon Server 124.

As shown in FIG. 3, an electronic coupon 300 is preferably a combination of indicia and graphics which communicates discount information 302, product title 304, owner's title 306, owner's coupon specification 308, uniform product code 310, digital representations of graphical images of a bar code 312, expiration date 314, digital representations of graphical images of the product 316. In addition coupon also contains its unique serial number 318 and would preferably contain customer's name 320, customer's identification number 322, customer's Internet address 324, and personalized message 326 tailored to a particular customer. The discount information 302 bears indicia identifying a particular value of the coupon. The electronic coupon 300 also includes the product title 304 which bears indicia identifying the product to which the coupon applies, owner's title 306 which bears indicia identifying a particular person or company participating in the electronic coupon communication system 100, as well as the owner's coupon specification data 308 which bears indicia that communicate the coupon owner's instructions to the consumer and the coupon redemption center, regarding coupon redemption. Uniform product code 310 bears the standardized product code provided to the electronic coupon communication system 100 by the coupon's owner which serves his or her own accounting purposes. Similarly, digital representation of a graphical image of a bar code 312 is a standardized machine readable code provided to the electronic coupon communication system 100 by the coupon's owner which serves his or her own accounting purposes. Expiration date 314 bears indicia indicating the expiration date of the coupon (if any). Furthermore, digital representation of a graphical image of the product 316 could bear a symbol, logo or an image related to the product graphically identifying the product. In addition, digital representation of the bar code's 312 and the product's 316 graphical image could utilize any of the image compression algorithms commonly used by general computing devices, such as the Joint Photographic Expert Group (JPEG) algorithm. Furthermore, electronic coupon 300 also contains a unique coupon serial number 318 generated by a coupon generation process 410 which identifies each particular electronic coupon 300 and plays an important role in marketing research and micro marketing techniques utilized by the coupon's owner. In the preferred embodiment of the invention, the electronic coupon 300 also contains customer's name data 320 bearing indicia pertaining to the name of coupon's user, customer's identification number (I.D.) 322 bearing customer I.D. assigned to the user by the Internet Coupon Server 124 during a registration process 408 having the customer's Internet address 324 and a personalized message 326 which bears a marketing message generated during the coupon generation process. Indicia pertaining to the coupon 302, 304, 306, 308, 310, 312, 314, 316 and 318 are stored in the coupon data base 130 before the coupon generation process 410 occurs. Indicia pertaining to customer's personal information 320, 322, 324 and 326 are stored in the user data base 126 before beginning the coupon generation process 410. After the coupon generation process 410, all indicia are stored, combined in the browsing memory 128 to represent an electronic coupon 300.

An electronic coupon 300 communicates a message to the user of the Internet node 102 when, for example, displayed on a viewing display 116 during the on-line session or stored in memory in the form of electronic mail 120, or when printed as a hard copy on user's printer 118.

A person can select an electronic coupon 300 from the Internet Coupon Server 124, print out a hard copy and redeem it at the coupon redemption center 142 (retail outlet) or the user could send the coupon using electronic mail from the Internet Coupon Server 124 directly to the redemption center's general computing device connected into public computer network such as the Internet 122. The redemption center 142 would have an option to verify the legitimacy of the electronic coupon 300 by contacting coupon owner's ICNC 134 using various communication means.

According to the present invention, user's general computing device connected to the public network such as the Internet 122, establishes an on-line session with the Internet Coupon Server 124, preferably goes through the registration process 408 if the user is a new user, and then, after the coupon generation process 410 described in detail below, makes a selection 412 from the available coupons in the Internet Coupon Server's browsing memory 128 which contains a selection of coupons organized in a data base.

In the preferred embodiment of the invention, browsing is customized so that it suits the needs and shopping patterns of a particular user. By entering user input, such as through the keyboard 114, the user can browse through the available coupons and make a selection of one coupon 300. For example, user input accepted through the keyboard 114 can step through, or browse through the available electronic coupons in the Internet Coupon Server's browsing memory 128 during an on-line session and by having the Internet Coupon Server 124 sequentially transmit digitized pattern of the electronic coupon over public computer network such as the Internet 122, to Internet node's 102 output device, such as the display 116. Once the user viewing the display 116 selects an electronic coupon 300 being displayed, such as by entering user input at the keyboard 114, the Internet Coupon Server 124 may ask the user to choose if the coupon is to be mailed electronically, Internet Coupon Server 124 prompts the user to input an electronic mail address 418. When electronic mail address is imputed, Internet Coupon Server 124 mails the coupon electronically to the addressee 420.

An added feature of the invention is that the user may choose to e-mail the coupon to him or herself allowing him or her to store the coupon for a later date handling or to send it directly to the vendor's Internet node over public computer network. In the preferred embodiment of the invention the coupon can be mailed in a simple ASCII format using Simple Mail Transport Protocol (SMTP) or as a graphical image using Multipurpose Internet Mail Extension (MIME). (SMTP RFC 821 and MIMIE RFCs 1521 and 1522 describe in detail the above mentioned electronic mail protocol and standard). However, other electronic mail protocols and standards used for electronic mail communication in public computer networks are also contemplated within the scope of the present invention. If the user elects not to mail the coupon electronically, Internet Coupon Server 124 prompts the user to input 424 whether the coupon is to be printed on the user's printing device 118. If the user chooses the printing option, the Internet Coupon Server 124 sequentially transmits coupon's digital data pattern to the Internet node's CPU 104 and the Internet node's printing device 118. Once the user has chosen one of the available options, transaction is recorded in the coupon database 130. User is then prompted to input whether to continue with coupon browsing or to exit the session 426. If the user chooses to continue with coupon browsing, Internet Coupon Server 124 starts a new coupon generation process 410 and directs the user to the browsing memory 128 to select another coupon 300. If the user chooses to discontinue with coupon browsing, Internet Coupon Server 124 exits the session 406.

Upon coupon selection 412, the transaction is recorded in the coupon data base 130, said data base containing Coupon Structure (Table 1). Field 1 "Number of coupons available" bears indicia providing information on the maximum number of electronic coupons the current unique coupon serial number 318 which makes a particular coupon unique. Fields 2,3,4,5,6,7,8 and 9 of the database have already been described in the explanation of FIG. 3. Field 11 will be explained in detail below.

TABLE 1

Coupon Structure

1. Number of coupons available
2. Coupon discount information
3. Product title
4. Owner's title
5. Owner's coupon specification data
6. Uniform Product Code
7. Graphical presentation of a Bar Code

TABLE 1-continued

Coupon Structure

Figure 5:
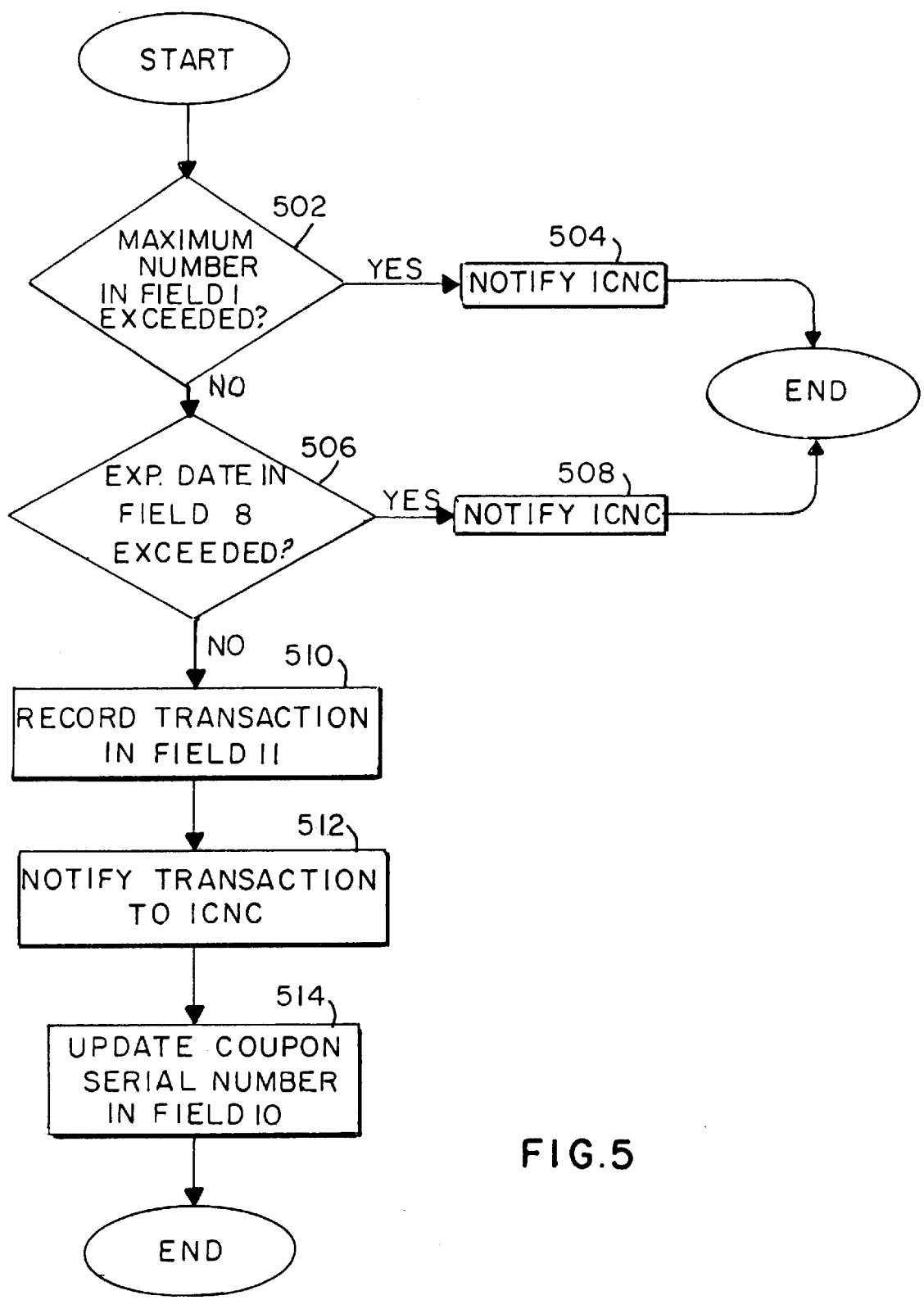
FIG. 5 is a flow diagram illustrating an operational sequence for recording coupon transactions in the coupon database.

8. Expiration date
9. Graphical presentation of a product
10. Coupon Serial Number
11. Past transactions As shown in FIG. 5, the Internet Coupon Server 124, accesses the coupon data base and verifies whether the maximum number of coupons is exceeded 502. If it is exceeded, the Internet Coupon Server 124 notifies this information 504 over Internet Coupon ICNC gateway 132 to the coupon owner's ICNC 134. If the maximum number of coupons was not exceeded, Internet Coupon Server 124 verifies whether the coupon expiration date was not exceeded, Internet Coupon Server 124 notifies this information 508 over the Internet Coupon ICNC gateway 132 to the coupon owner's ICNC 134. If the expiration date was not exceeded, the Internet Coupon Server records the transaction 510 in the field 11 which contains past transactions, by first storing customer's name, then customer's identification number and then the current coupon serial number. After the transaction is recorded, the Internet Coupon Server 124 notifies the transaction 512 over the Internet Coupon ICNC gateway to the coupon owner's ICNC 134 by first sending customer's name 320, then customer's identification number 322 and then the current coupon serial number 318. After the ICNC 134 has been notified, the Internet Coupon Server 124 updates 514 the coupon serial number 318 which serves as a coupon's unique indicia. This action 514 comprises of either adding or subtracting one number to the already existing coupon serial number, or changing the coupon serial number to random or partly random indicia. Any combination of indicia and any formula for the formation of coupon serial number is contemplated within the scope of the present invention.

Figure 6:
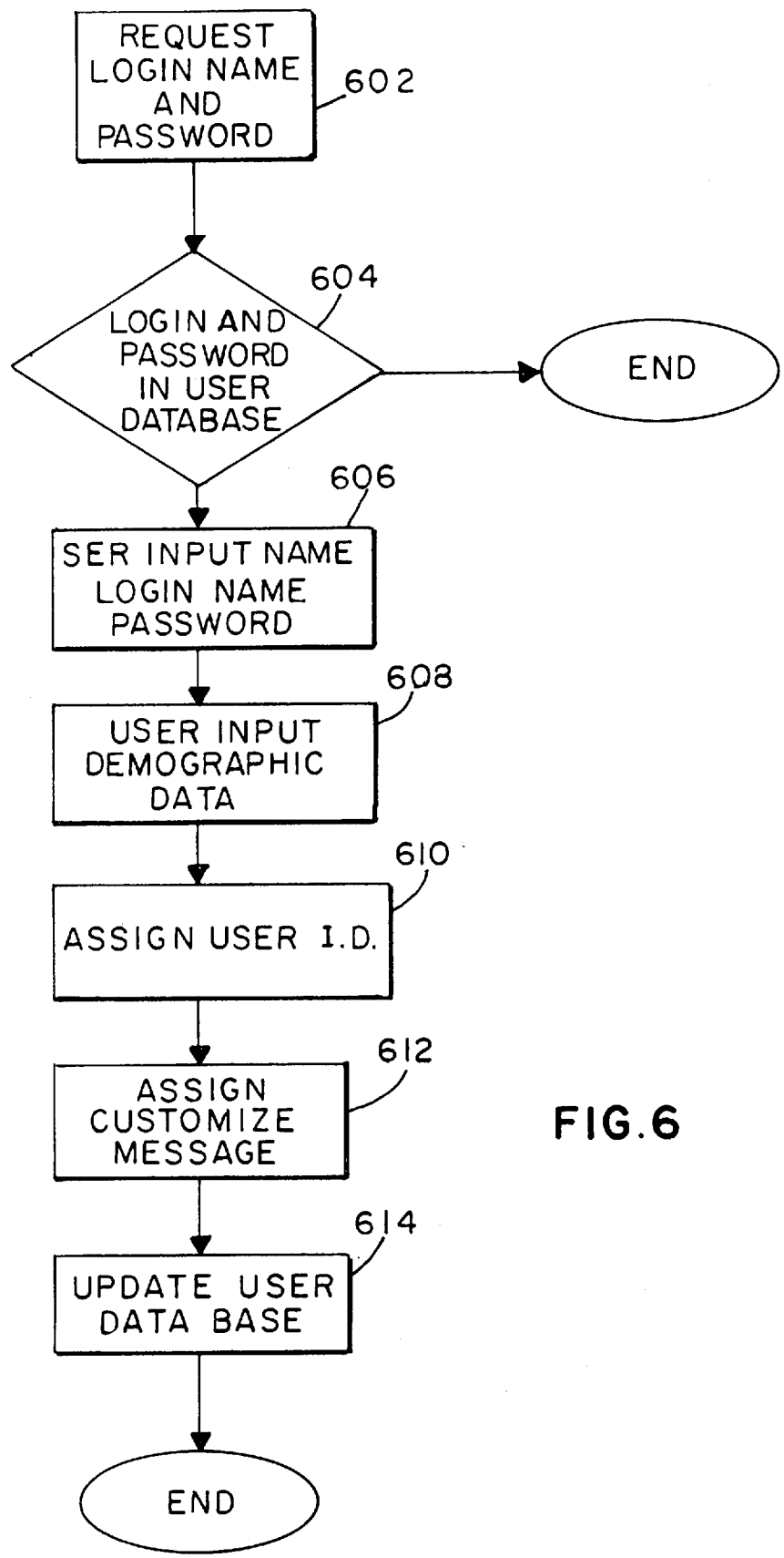
FIG. 6 is a flow diagram illustrating an operational sequence of the user registration process, according to the preferred embodiment of the present invention.

FIG. 6 illustrates the user registration process. User data base contains User Data Structure as shown below in Table 2.

TABLE 2

User Data Structure

1. User name
2. User login name
3. User password
4. User identification number
5. User demographic information
6. User customized message Field 1 bears indicia identifying user's first and last name. Field 2 bears indicia identifying user's system login name. Field 3 bears indicia identifying user's secret code i.e. password. Field 1,2 and 3 are indicia which the Internet Coupon Server receives from the user during the initial registration process and places in the user data base. Field 4 bears indicia identifying user's identification number assigned to the user by the Internet Coupon Server during the time of initial registration. Field 5 bears indicia identifying user's demographic information which the Internet Coupon Server receives from the user during the initial registration process. Field 6 bears indicia identifying personalized message to the user, which can be periodically changed.

According to the preferred embodiment of the invention, in order for the user to enter the Internet coupon communication system, Internet Coupon Server 124 requests login name and password from the user 602. Internet Coupon Server 124 then verifies 604 whether user's login name (login) and password match any login and password in the user data base 126. If login and password match any login and password in user data base, the registration process ends. If the login and password do not match any login and password in the user database, the user is prompted to input his name 606 which is then stored in field 1 of the user data base. The user is then prompted to input preferred login name and password 606 for later use, which are then stored in fields 2 and 3 respectively. The user is then prompted to input demographic information 608, such as location, sex, occupation, household income and any other pertinent demographic information preset by the Internet Coupon Server 124, which is then stored in the field 5 of the user data base 126. The Internet Coupon Server 124 then assigns an identification number to the user 610 and stores it in field 4 of the user data base. Subsequently, Internet Coupon Server assigns the standard customized message 612 in field 6 of the user data base which could be changed from time to time.

Figure 7:
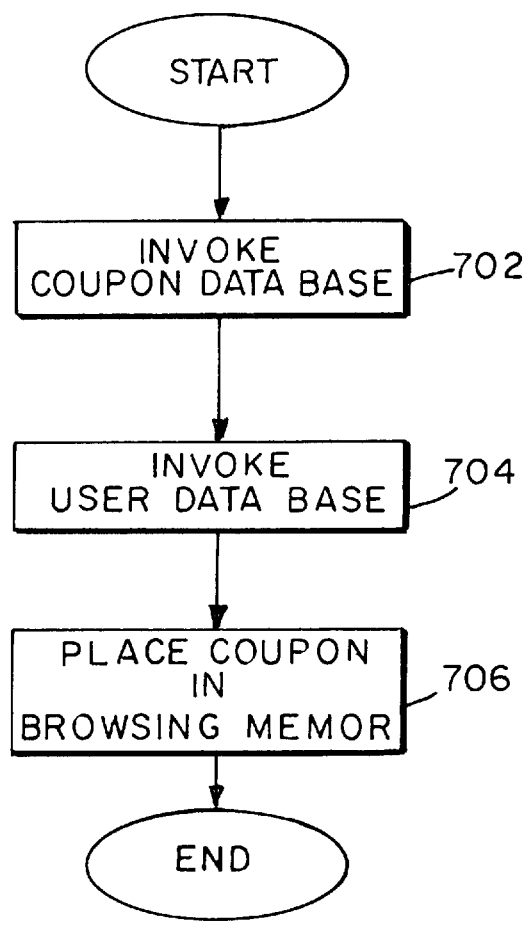
FIG. 7 is a flow diagram illustrating an operational sequence of the coupon indicia generating process, according to the preferred embodiment of the present invention.

FIG. 7 illustrates the preferred embodiment of the coupon generation process 410 wherein the Internet Coupon Server 124 first invokes 702 coupon database 130 and takes the information contained in the coupon data base fields 2,3,4, 5,6,7,8,9 and 10 as illustrated in Table 1. Internet Coupon Server 124 then invokes the user database 126 and takes the name of the current user, current user's identification number, user's Internet address, and user's personalized message (if any) used for micro marketing techniques. All coupon elements are then placed in combination, in the Internet Coupon Server's browsing memory 128, ready for user's perusal. In the preferred embodiment of the present invention, the Internet node 102 will access Internet Coupon Server's browsing memory 128 during the on-line session over public computer network such as the Internet 122 using Internet Protocol (IP). In the event that the Internet Coupon Server 124 does not contain the user data base 126, it is contemplated in the scope of present invention that a combination of coupon elements described in FIG. 3 could be placed directly in the browsing memory 128, without the added features of elements 320, 322, 324, 326 or without the added feature of an element representing coupon serial number 318 in the event that Internet Coupon Server 124 does not contain the coupon data base 130.

Figure 8:
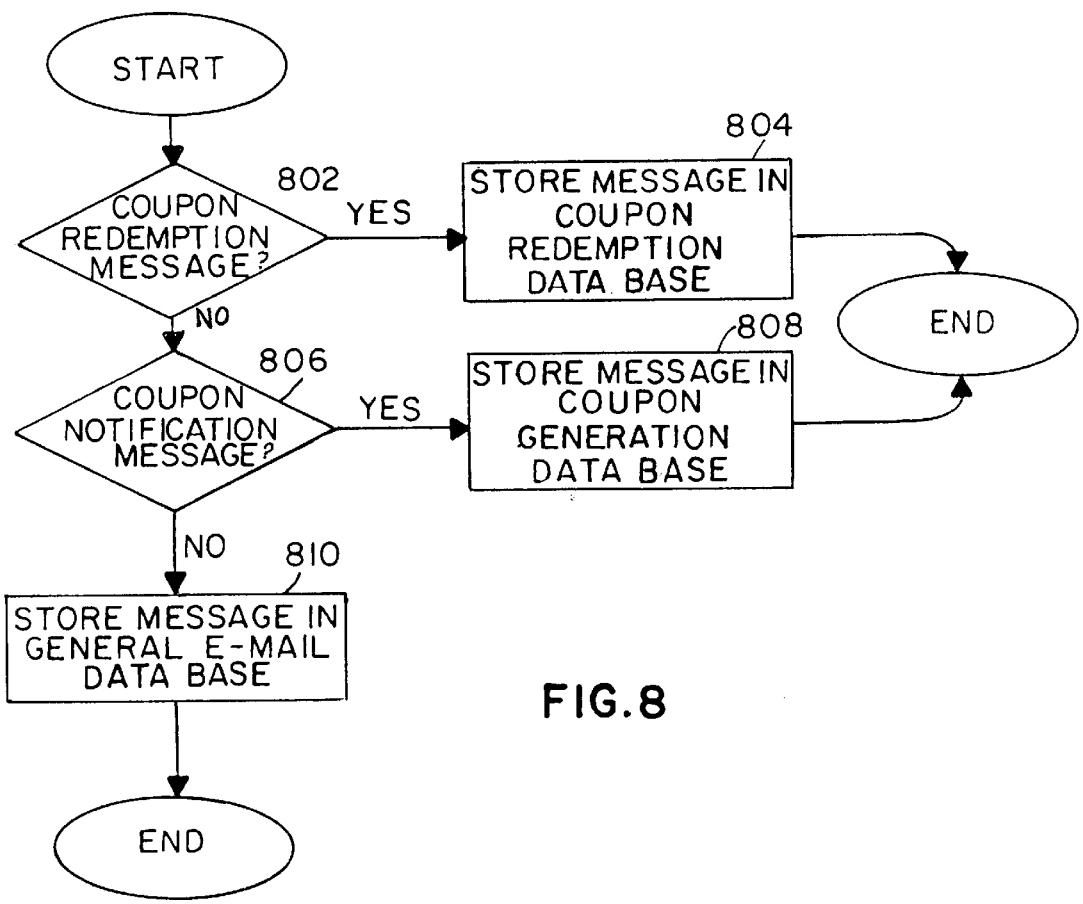
FIG. 8 is a flow diagram illustrating an operational sequence for the Internet Coupon Notification Center, according to the preferred embodiment of the present invention.

FIG. 8 illustrates an operational sequence for the Internet Coupon Notification Center (ICNC) 134 according to the preferred embodiment of the present invention. It is envisioned in the preferred embodiment of the present invention that each coupon category has its own ICNC 134. Several ICNCs can be coupled together and contained in one general computing device connected to the Internet Coupon Server 124 over the public computer network, or could be contained in the Internet Coupon Server 124 itself. Each ICNC is comprised of the coupon redemption data base 138, the coupon generation data base 136 and the general message data base 140. The coupon redemption data base 138 stores electronic messages identifying redeemed coupons, coupon generation data base 136 identifying coupons generated by the Internet coupon server 124 but not yet redeemed, and a general message data base 140 containing messages of general nature. When an ICNC 134 receives an electronic message from the Internet Coupon's ICNC Gateway 132, it first verifies whether that electronic message is a coupon redemption message 802 notifying the ICNC 134 that a particular coupon in the ICNC's coupon category was redeemed. If the message is a coupon redemption message, the message is stored 804 in the ICNC's coupon redemption data base 138, said message containing coupon serial number and redemption center's identification number. If the message is not a coupon redemption message, the ICNC verifies whether the electronic message is a coupon generation message 806, thereupon notifying the ICNC 134 that a particular coupon in the ICNC's coupon category was generated by the Internet Coupon Server 124. If the message is a coupon generation message, the message is stored 808 in the coupon generation data base 136, the message containing coupon's serial number and the user's identification number. Otherwise, the message is stored 810 in the general message data base 140.

Figure 9:
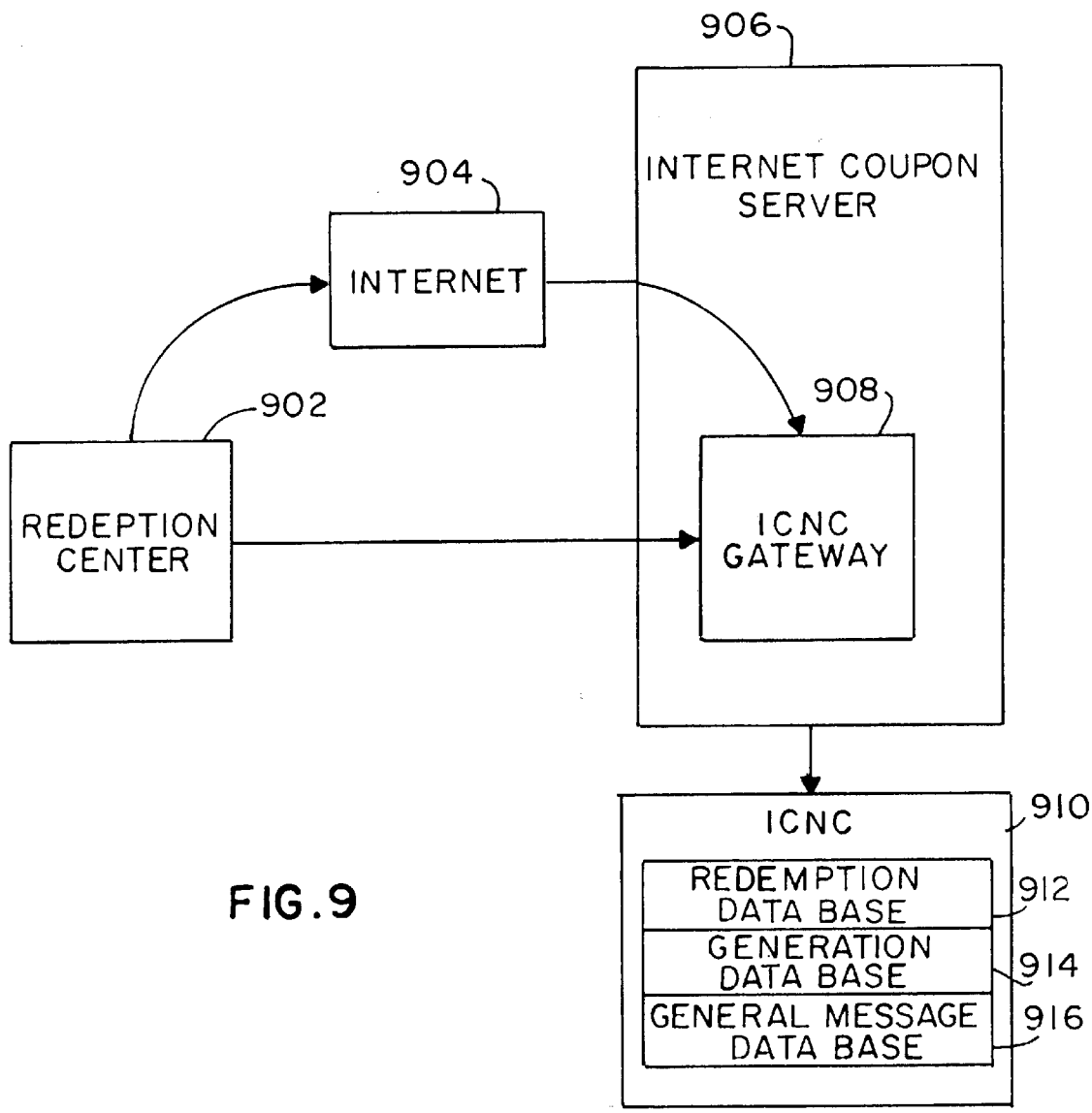
FIG. 9 is a block diagram illustrating an electronic coupon verification and redemption system according to the preferred embodiment of the present invention.

FIG. 9 illustrates an electronic coupon verification and redemption system according to the preferred embodiment of the present invention. The redemption center (retail outlet) 902 can verify electronically the validity of the coupon, by accessing by various electronic means, the ICNC's coupon generation data base 914 and coupon redemption data base 912, and verifying whether the coupon brought by redemption center's customer is indeed valid. Similarly the redemption center 902 can also notify the redemption of the coupon to the coupon's ICNC 910 using various electronic means. In the preferred embodiment of the present invention, the redemption center's computing device is coupled with Internet Coupon Server's ICNC gateway 908 through communication network, such as electronic data interchange network, public computer network or wireless network. After the redemption center 902 establishes a connection with the ICNC gateway 908, the redemption center reports coupon serial number to the ICNC gateway 908. Based on the coupon serial number, the ICNC gateway 908 identifies the coupon category and the coupon's ICNC 910 and establishes a connection with the ICNC 910, through a computer interface, telephone dial-up interface or an electronic data interchange interface, thus enabling communication between the redemption center's computing device and ICNC 910.

Optionally the ICNC may contain a billing system which credits the account of the current coupon holder, such as the redemption center or a coupon user, and debits the account of the coupon owner. Furthermore, the ICNC may contain a demographic research system which would access Internet Coupon Server's registration data base and coupon data base and research demographic information. Additionally, the ICNC may contain a control system which would enable it to access Internet Coupon Server's coupon data base and change the coupon information electronically.

We claim:

1. An electronic computer coupon communication system, comprising:
   (a) a network node for selecting, receiving and printing electronic coupons over a public computer network such as the Internet, said node including:
      (1) a display coupled to a control processing unit for displaying at least one electronic coupon;
      (2) a memory for storing electronic coupons received through electronic transmission from an Internet Coupon Server, which memory permits browsing on said display;
      (3) a user input device coupled to said central processing unit to permit a user to make an on-line selection of one of a plurality of electronic coupons collectively stored in said Internet Coupon Server's memory;
   (b) said Internet Coupon Server being coupled to the Internet Coupon Notification Center, said Internet Coupon Server comprising:
      (1) a memory for storing electronic coupons received from an Internet Coupon Server's supplier;
      (2) a central processing unit for generating and transmitting electronic coupons and for recording and transmitting electronic coupon transactions;
      (3) an Internet Coupon Notification Center Gateway for enabling communication with said Internet Coupon Notification Center;
   (c) an Internet Coupon Notification Center, including:
      (1) means for recording serial numbers of coupons generated by an Internet Coupon Server;
      (2) means for recording and updating transactions pertaining to redeemed electronic coupons; and
   (d) an electronic coupon, comprising:
      (1) a plurality of digital representations of product image and uniform product bar code;
      (2) a plurality of digital representations of indicia identifying discount information, product title, coupon owner's title, redemption specification, uniform product code, expiration date, coupon serial number, user's name, user's identification number, user's Internet address and user's personalized message.

2. The electronic computer coupon communication system of claim 1, wherein said Internet Coupon Server further comprises:
   means for storing electronic coupon elements;
   means for generating electronic coupons;
   means for storing a collection of electronic coupons;
   means for recording coupon transmission;
   means for transmitting information about coupon transactions; and
   means for recording user data.

3. The electronic computer coupon communication system of claim 1, wherein said Internet Coupon Server, utilizes a method of operation comprising the steps of:
   generating a new electronic coupon with a unique serial number upon the beginning of an on-line session with an Internet node;
   transmitting said selected electronic coupon over a public computer network; and
   recording the transmission in said coupon data base.

4. A method of generating a desired coupon in an electronic coupon communication system, comprising the steps of:
   selecting an electronic coupon by a user of a computer network node during an on-line session with a computer network Coupon Server;
   selecting a coupon from said computer network Coupon Server;
   generating a new coupon at the beginning of an on-line session;
   receiving a user selection of the electronic coupon during the on-line session from said computer network Coupon Server to said computer network node;
   transmitting the electronic coupon to the user's computer network node during the on-line session;
   displaying said electronic coupon on a display device on said computer network;
   generating an optional request message for requesting said electronic coupon to be sent electronically;
   transmitting said optional request message corresponding to the selection of the electronic coupon request message including the electronic mail address of destination;

arranging a coupon data base update in response to said electronic coupon transmission, for recording the transaction, including the user's identification number and coupon serial number;

changing the coupon serial number in coupon data base;

sending a message to the coupon's Internet Coupon Notification Center, said message comprising the coupon serial number and the user's identification number; and verifying the validity of an electronic coupon at a redemption center by accessing said Internet Coupon Notification Center's coupon generation database and an electronic coupon, comprising:

(1) a plurality of digital representations of product image and uniform product bar code;

(2) a plurality of digital representations of indicia identifying discount information, product title, coupon owner's title, redemption specification, uniform product code, expiration date, coupon serial number, user's name, user's identification number, user's Internet address and user's personalized message.

5. The method of claim 4, wherein said electronic coupon generation process includes:

taking coupon indicia and digital representations of graphical images in said coupon data base;

coupling said coupon indicia with said user indicia in said user data base; and placing said coupon indicia in a browsing memory to represent an electronic coupon.

6. The method of claim 5, wherein said redemption center records the redemption of coupons by sending a message to said computer network Coupon Notification Center's redemption data base.

7. A computerized electronic coupon generating system having an arrangement for recording and analyzing data relative to said coupon, over a public computer network, comprising:

means for selecting an electronic coupon by a user of a computer network;

means for generating an electronic coupon at the initiation of a session on a public computer network;

means for receiving the selection of an electronic coupon of the user during a session on a public computer network;

means for transmitting electronic coupons to the user's computer system during a session on a public computer network;

means for displaying electronic coupons on he user's computer system;

means for generating an optional request message for requesting electronic coupons to be sent electronically;

means for transmitting an optional request message corresponding to the selection of the electronic coupon, including the electronic mail address of destination;

means for arranging a coupon data base update for recording the transaction in response to an electronic coupon transmission including recording the user's identification number and coupon serial number;

means for sending a message to a computer network notification center, said message including said coupon's serial number and the user's identification number so as to thus record and provide an analytical base for said electronic coupon generation system;

means for verifying the validity of an electronic coupon at a redemption center by accessing the Internet Coupon Notification Center's coupon generation data base; and an electronic coupon, comprising:

(1) a plurality of digital representations of product image and uniform product bar code:

(2) a plurality of digital representations of indicia identifying discount information, product title, coupon owner's title, redemption specification, uniform product code, expiration date, coupon serial number, user's name, user's identification number, user's Internet address and user's personalized message.

8. The computerized electronic coupon generating system as recited in claim 7, also including:

means for taking coupon indicia and digital representations of graphical images in said coupon data base;

means for coupling said coupon indicia with said user indicia in said user data base; and means for placing coupon indicia in a browsing memory to represent an electronic coupon.

9. The computerized electronic coupon generating system as recited in claim 8, also including:

means for recording the redemption of coupons by said redemption center by sending a message to said computer network Coupon Notification Center's data base.

* * * * *